July 28, 1925.

G. J. LEBER 1,547,593

WINDOW OPERATING MECHANISM FOR MOTOR VEHICLES

Filed March 12, 1924     2 Sheets-Sheet 2

INVENTOR
George J. Leber
BY
ATTORNEYS

Patented July 28, 1925.

1,547,593

UNITED STATES PATENT OFFICE.

GEORGE J. LEBER, OF CLEVELAND HEIGHTS, OHIO, ASSIGNOR OF ONE-HALF TO OSCAR A. SMITH, OF EAST CLEVELAND, OHIO.

WINDOW-OPERATING MECHANISM FOR MOTOR VEHICLES.

Application filed March 12, 1924. Serial No. 698,581.

*To all whom it may concern:*

Be it known that I, GEORGE J. LEBER, a citizen of the United States, residing at Cleveland Heights, in the county of Cuyahoga and State of Ohio, have invented certain new and useful Improvements in Window-Operating Mechanism for Motor Vehicles, of which the following is a specification.

This invention relates to window operating or controlling mechanism, particularly adapted for motor vehicles, the object of the invention being to provide a window operating means which will efficiently and quickly raise or lower the window of a motor vehicle its maximum distance with a small expenditure of effort and positively maintain it in any of its adjusted positions, and in which the window will be free from vibration rattles, and which mechanism will be comparatively simple in construction and inexpensive to manufacture, durable and serviceable in use, and not liable to get out of order.

Figure 1:
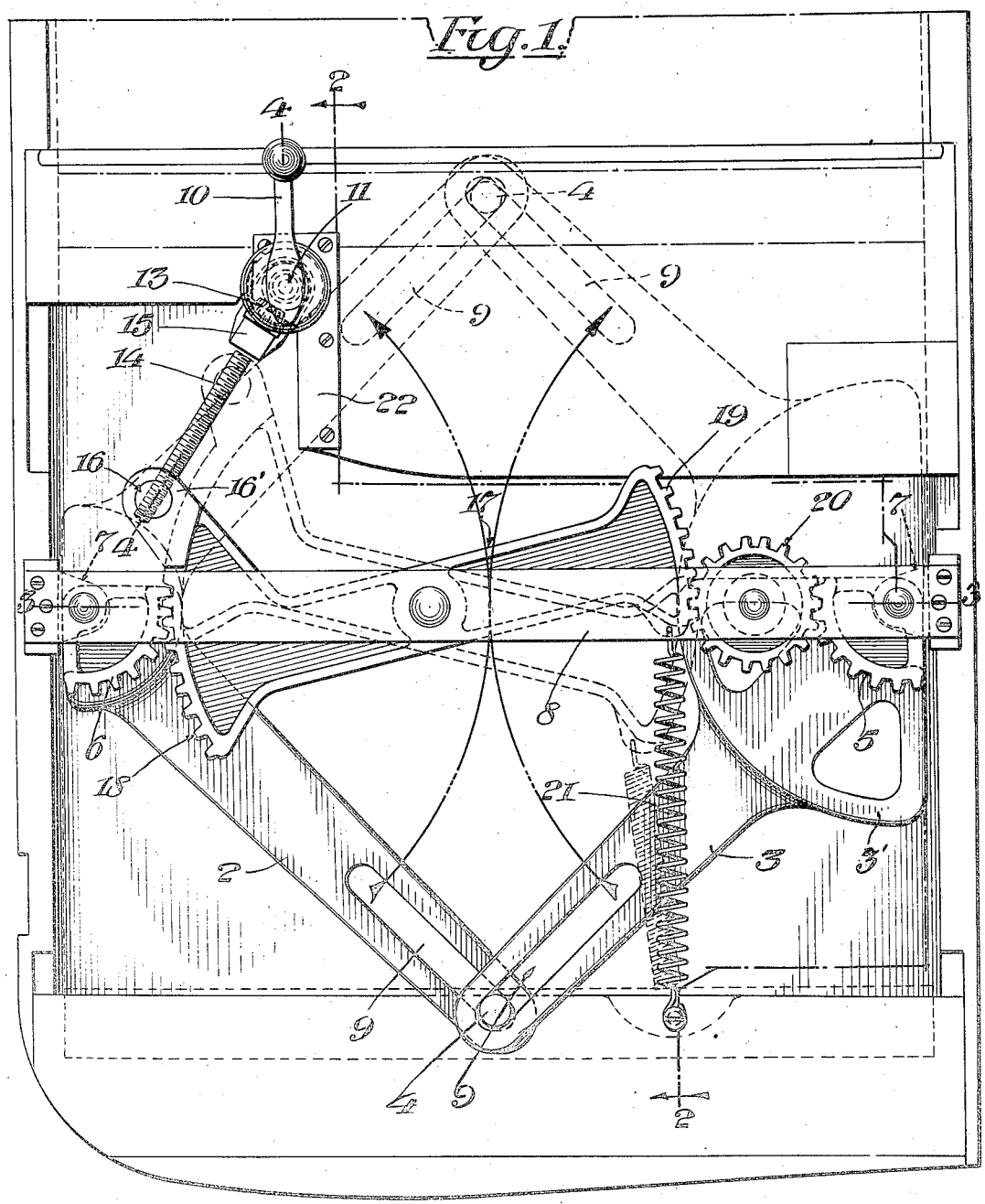
Figure 2:
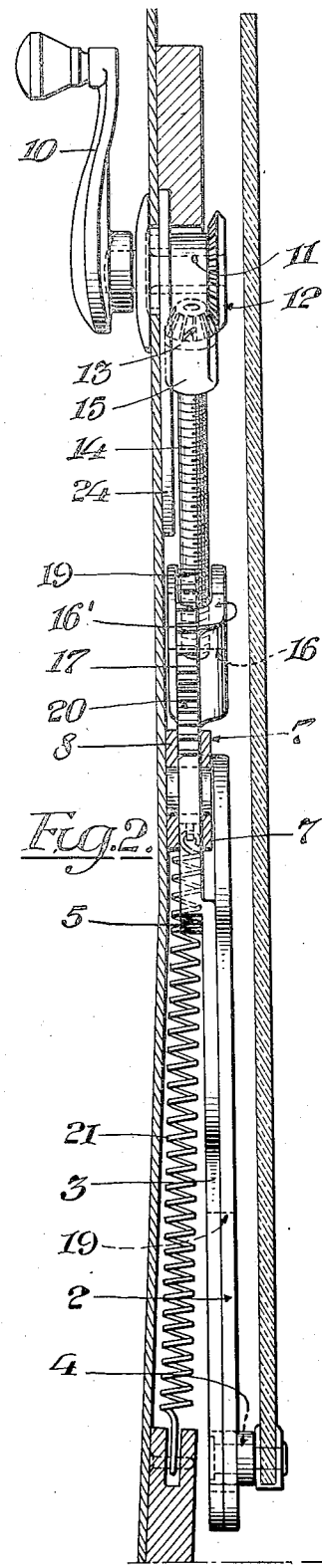
Figure 3:
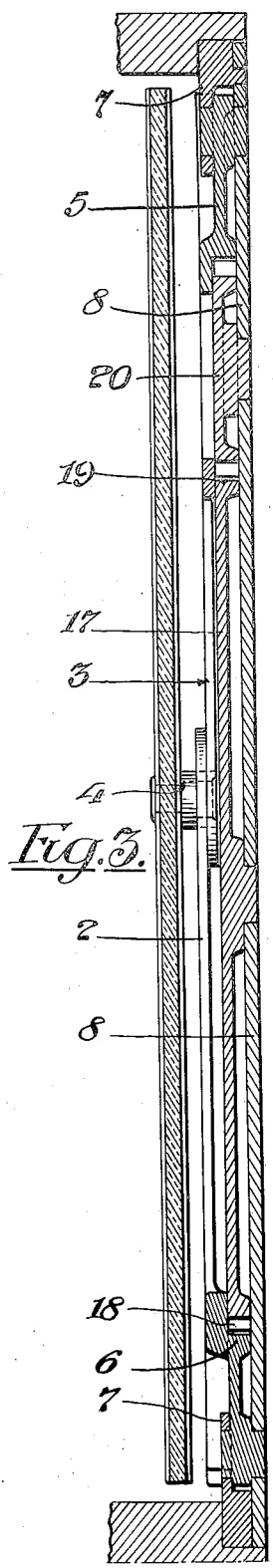
Figure 4:
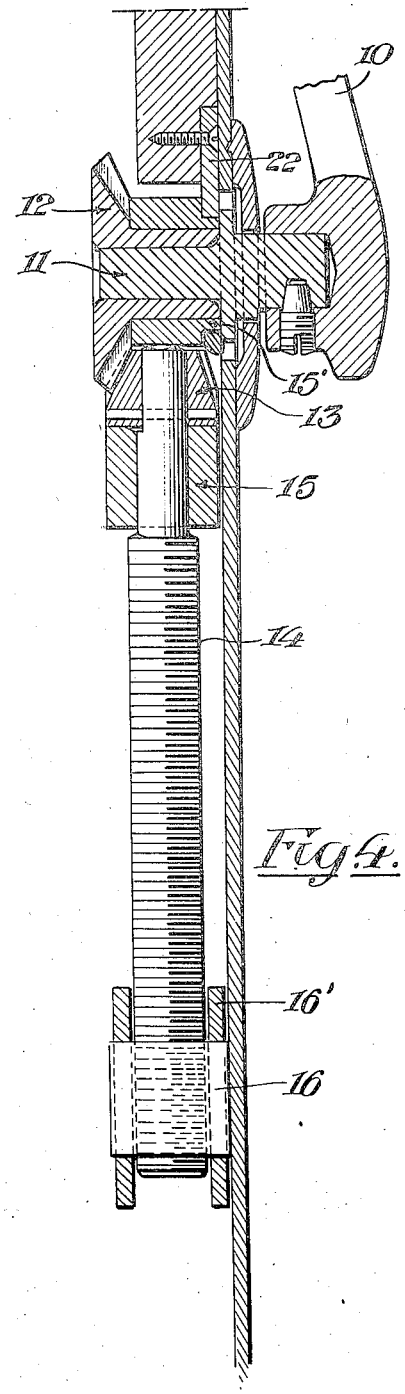

In the drawings accompanying and forming a part of this specification, Fig. 1 is what may be considered a front view of this improved window operating mechanism; Fig. 2 is a vertical sectional view taken on line 2—2 Fig. 1; Fig. 3 is a vertical sectional view taken on line 3—3 Fig. 1; and Fig. 4 is a detail enlarged vertical sectional view of the crank operating part of the mechanism.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

Considerable trouble in the past has been experienced in providing a satisfactory window operating mechanism for motor vehicles because of the difficulties under which such mechanism must be applied and operated. The jars and strains to which the vehicle is subjected causes the window to vibrate and rattle and the window and window-carrying door frequently get out of true so that there is considerable difficulty in raising and lowering the window. The present improved mechanism overcomes these disadvantages since the window is balanced at all points during its movements, and the mechanism is so simple and efficient that it is practically impossible for it to get out of order while the window may be positively locked in any position.

In the preferred form thereof herein shown this improved operating mechanism comprises a pair of operating levers 2 and 3 pivotally connected at their inner overlapping ends centrally of the window sash at the upper part of the window as at 4. These overlapping ends of the levers 2 and 3 are provided with elongated slots 9 in which the pivot 4 connecting the levers to the window sash works. Each of these levers at its outer or opposite end is provided with a segmental gear 5, 6, and the outer end of each lever is pivotally supported between a suitable bracket 7 and a cross or reinforcing member or bar 8 both secured to the window frame, thus forming a double bearing support to hold the levers 2 and 3 in correct working position. The segmental gears 5 and 6 may be formed as a part of the levers 2 and 3, which are pivotally connected between the bracket 7 and bar 8. Suitably supported in proper position to be manipulated is an operating crank 10 attached to a stud 11 (see Fig. 4) and on the opposite end of this stud is a bevel gear 12 in mesh with a bevel pinion 13 fixed to a screw shaft 14. These bevel gears may have a ratio of two to one. The bevel pinion 13 is carried by a swinging housing 15 which also acts as a support for the screw shaft 14 and this housing 15 is swingingly supported on a trunnion projection 15', and this projection has a circular bearing in a crank shaft retaining plate 22. The opposite end of the screw shaft projects into a threaded swivel nut 16 carried by an extension or projection 16' of an oscillating or swinging member 17,—termed herein a rolling gear member. This gear member 17 is provided at its opposite ends with segmental teeth 18, 19, the teeth 18 meshing with the segmental gear 6. This member is pivotally supported centrally thereof on the supporting bar 8 and has its teeth 19 in engagement with a gear or pinion 20 likewise supported on the bar 8, and this gear 20 has its teeth in mesh with the teeth of the segmental gear 5. To maintain the teeth of this member 17 in close mesh with the teeth of sector gears 6 and 7 and prevent any clicking or noise thereof, a coiled spring 21 is connected with one end thereof adjacent to the teeth 19, its opposite end being connected with the door near the bottom thereof. The lever 3 is provided with an extension or wing 3' which overlaps the gear 20 and a part of sector member 17, and thus holds them in position against the bar 8 and so prevents lateral movement thereof. By means of this improved construction of window operating means it will be observed that a small angular travel of the rolling gear sector member 17 develops a large angular movement of the lifting levers 2 and 3, so that a short movement of the lifting screw 14 will give ample movement to the window for any required maximum movement. As an illustration, a 28° travel of the rolling gear sector would develop approximately a 90° movement of the lifting levers, and a movement of 3⅜ inches for instance of the lifting screw would give approximately a 20 inch movement of the window. Furthermore it will be seen that the lifting power is applied on the center vertical line of the window, thus maintaining the window balanced at all points of its lift and preventing vibration rattles while at the same time the window will be maintained locked in any position to which it may be adjusted.

It will also be observed that the operating mechanism is quick-acting requiring but a minimum number of turns to give the maximum opening and closing movement to the window and that there is nothing to get out of order so that the mechanism is positive in its operation, efficient in use, comparatively inexpensive and will operate with speed and certainty.

Furthermore it will be seen that there is no lateral strain or binding of the window due to the door carrying the window being out of plane, or warping, and that the center line of the window and lifting levers coincide.

In operation the turning of the handle 10 will rotate the screw shaft 14 to oscillate the rolling gear member 17 on its pivot so that the levers 2 and 3 will be moved either into their full-line positions shown in Fig. 1 or in their dotted-line positions shown in Fig. 1, in which latter position the window is raised and in the former position the window is lowered, the rolling gear 17 operating through its teeth to operate the segment gears 5 and 6 and thereby swing the levers 2 and 3 up or down, and as these levers are connected centrally of the window the window is maintained in a balanced position at all times during the raising or lowering thereof, while a minimum number of turns of the handle 10 imparts a maximum movement to the window.

It is to be understood that by describing in detail herein any particular form, structure, or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In a window operating mechanism, the combination of a pair of levers pivotally connected to the center of the window sash, gearing connected with both of said levers for swinging them together, thereby to raise or lower the window rotating means for operating said gearing, and a handle for operating said rotating means.

2. In a window operating mechanism, the combination of a pair of levers pivotally connected to the center of the window sash, said levers having their ends overlapping and provided with elongated slots for the reception of the pivot, gearing connected with both of said levers for swinging them together, thereby to raise or lower the window rotating means for operating said gearing, and a handle for operating said rotating means.

3. In a window operating mechanism, the combination of a pair of pivotally supported levers having their inner ends pivotally connected to the window sash centrally thereof and each having a segmental gear, and means including a single rotary operating means cooperating with said gears for swinging said levers thereby to raise or lower the window.

4. In a window operating mechanism, the combination of a pair of slotted overlapping levers pivotally connected centrally to the window sash at the upper end thereof and at their outer ends at opposite sides of the window, each of said levers having a segmental gear at its outer end, a rolling gear member cooperating with said segmental gears, and means for oscillating said rolling gear member.

5. In a window operating mechanism, the combination of a pair of slotted overlapping levers pivotally connected centrally to the window sash at the upper end thereof, each of said levers having a segmental gear at its outer end, a rolling gear member cooperating with said segmental gears, means for oscillating said rolling gear member and comprising a threaded shaft, and means for rotating said shaft.

6. In a window operating mechanism, the combination of a pair of slotted overlapping levers pivotally connected centrally to the window sash, each of said levers having a segmental gear at its outer end, a rolling gear member cooperating with said segmental gears, means for oscillating said rolling gear member and comprising a threaded shaft, and means for rotating said shaft and comprising a pair of meshing gears and a crank.

7. In a window operating mechanism, the combination of a pair of cooperating swinging levers pivotally connected at their inner ends centrally of the window sash and provided with a pair of segmental gears, a rolling gear member having segmental gears at its opposite ends, one in engagement with the segmental gear of one lever and the other in engagement with a gear meshing with the other segmental gear of the other lever, a threaded shaft cooperating with one end of the rolling gear member, and means for rotating said shaft.

8. In a window operating mechanism, the combination of a pair of cooperating swinging levers pivotally connected at their inner ends centrally of the window sash and provided with a pair of segmental gears, a rolling gear member having segmental gears at its opposite ends, one in engagement with the segmental gear of one lever and the other in engagement with a gear meshing with the other segmental gear of the other lever, a threaded shaft, a swivel nut connecting said shaft and rolling gear member, and means for rotating said shaft.

9. In a window operating mechanism, the combination with lever mechanism connected to the window at the upper end thereof, and means for swinging said lever mechanism thereby to raise and lower the window and including a rolling gear member having teeth at opposite ends thereof.

10. In a window operating mechanism, the combination with lever mechanism connected to the window, means for swinging said lever mechanism thereby to raise and lower the window and including a rolling gear member having teeth at opposite ends thereof, and a screw shaft having a swivel-nut connection with said rolling gear member for shifting said rolling gear member.

11. In a window operating mechanism, the combination with lever mechanism connected to the window, and means for swinging said lever mechanism thereby to raise and lower the window and including a rolling gear member having teeth at opposite ends thereof, the construction being such that a small angular travel of the rolling gear member will give a large angular travel of the lever mechanism.

12. In a window operating mechanism, the combination with lever mechanism connected to the window, means for swinging said lever mechanism thereby to raise and lower the window and including a rolling gear member having teeth at opposite ends thereof, and a screw shaft having a swivel-nut connection with said rolling gear member for shifting said rolling gear member, the construction being such that a short movement of the screw shaft will effect a maximum lift to the window.

13. In a window operating mechanism, the combination of a pair of levers pivotally connected at their inner ends centrally of the window sash and pivotally connected at their outer ends at opposite sides of the window and positively acting, hand operated means, for first raising and lowering said levers thereby to shift the window.

14. In a window operating mechanism, the combination of a pair of levers pivotally connected at their inner ends centrally of the window sash and pivotally connected at their outer ends at opposite sides of the window, and means for raising and lowering said levers and including a rolling gear member having teeth at opposite ends thereof.

15. In a window operating mechanism, the combination of a pair of levers pivotally connected at their inner ends centrally of the window sash and pivotally connected at their outer ends at opposite sides of the window, means for raising and lowering said levers and including a rolling gear member having teeth at opposite ends thereof, a rotary shaft cooperating with said member, and means for rotating said shaft.

16. In a window operating mechanism, the combination of a pair of levers pivotally connected at their inner ends centrally of the window sash and pivotally connected at their outer ends at opposite sides of the window, and means for raising and lowering said levers and including a pivotally supported gear formed member and a screw shaft swivel-nut connected to said pivotally supported member.

17. In a window operating mechanism, the combination of a pair of levers pivotally connected at their inner ends centrally of the window sash and pivotally connected at their outer ends at opposite sides of the window, means for raising and lowering said levers and including a rolling gear member having teeth at opposite ends thereof, a rotary shaft swivel-nut connected to said rolling gear member, and means for rotating said shaft.

18. In a window operating mechanism, the combination of a pair of slotted overlapping levers pivotally connected at their slotted ends centrally of the window sash and pivotally connected at their outer ends at opposite sides of the window, each of said levers having a segmental gear, and means meshing with said gears for swinging said levers thereby to raise and lower the window and comprising a rolling gear member having teeth at opposite ends thereof, and means for oscillating said member.

19. In a window operating mechanism, the combination of a pair of slotted overlapping levers pivotally connected at their slotted ends centrally of the window sash and pivotally connected at their outer ends at opposite sides of the window, each of said levers having a segmental gear, and means meshing with said gears for swinging said levers thereby to raise and lower the window and comprising a rolling gear member having teeth at opposite ends thereof, means for oscillating said member, and a spring connecting the window and gear member.

20. In a window operating mechanism, the combination of a pair of slotted overlapping levers pivotally connected at their slotted ends centrally of the window sash and pivotally connected at their outer ends at opposite sides of the window, each of said levers having a segmental gear, and means meshing with said gears for swinging said levers thereby to raise and lower the window and comprising a rolling gear member having teeth at opposite ends thereof, means for oscillating said member, said last means comprising a rotary screw shaft swivel-nut connected to the rolling gear member, a pair of bevel gears one connected with said screw shaft, and means for rotating said gears thereby to rotate the shaft.

21. In a window operating mechanism, the combination of a pair of swingingly supported levers pivotally connected at their inner ends centrally of the window sash at the upper end thereof and at their outer ends at opposite sides of the window, and gear mechanism between the swingingly supported ends of said levers for operating them to raise or lower the window.

22. In a window operating mechanism, the combination of a pair of swingingly supported levers pivotally connected at their inner ends centrally of the window sash, gear mechanism between the swingingly supported ends of said levers for operating them to raise or lower the window and including a pivotally supported member having gear teeth at its opposite ends, and means for operating said gear member.

23. In a window operating mechanism, the combination of a pair of swingingly supported levers pivotally connected at their inner ends centrally of the window sash and pivotally supported at their outer ends to provide a large angular movement thereof, means including a segmental gear member for swinging said levers, and means for shifting said gear member whereby a small angular movement thereof will swing said levers.

24. In a window operating mechanism, the combination of a pair of levers pivotally connected at their inner ends centrally of the window sash and pivotally connected at their outer ends at opposite sides of the window, means for raising and lowering said levers and including a pivotally supported member and a screw shaft, a swivel nut connection between said screw shaft and pivotally supported member, a pair of gears, one carried by said shaft for rotating it, and a swinging housing for supporting said shaft gear.

25. In a window operating mechanism, the combination of a pair of slotted overlapping levers pivotally connected at their slotted ends centrally of the window sash and pivotally connected at their outer ends at opposite sides of the window, each of said levers having a segmental gear, and means meshing with said gears for swinging said levers thereby to raise and lower the window and comprising a rolling gear member having teeth at opposite ends thereof, means for oscillating said member, said last means comprising a rotary screw shaft swivel-nut connected to the rolling gear member, a pair of bevel gears one connected with said screw shaft, swinging means for supporting said screw shaft bevel gear, and means for rotating said gears thereby to rotate the shaft.

26. In a window operating mechanism, the combination of a pair of levers pivotally connected to the center of the window sash, and means for swinging said levers thereby to raise or lower the window and including a pivoted lever having gearing at its opposite ends, a rotary shaft, swiveled means for supporting said shaft at its lower end, and swinging means for supporting it at its upper end.

27. In a window operating mechanism, the combination with lever mechanism connected to the window and means for swinging said lever mechanism thereby to raise and lower the window and including a rolling gear member having teeth at opposite ends thereof, a rotary shaft, swiveled means for connecting the lower end of said shaft with said rolling gear member, and swinging means for supporting the upper end of said shaft.

28. In a window operating mechanism, the combination with lever mechanism connected to the window, and means for swinging said lever mechanism thereby to raise and lower the window and including a rolling gear member having teeth at opposite ends thereof, the construction being such that a 26° travel of the rolling gear member will give a 90° travel of the lever mechanism.

29. In a window operating mechanism, the combination with lever mechanism connected to the window, means for swinging said lever mechanism thereby to raise and lower the window and including a rolling gear member having teeth at opposite ends thereof, and a screw shaft having a swivel-nut connection with said rolling gear member for shifting said rolling gear member, the construction being such that a stroke of 3⅜ inches of the screw shaft will effect a 20-inch lift to the window.

30. In a window operating mechanism, the combination of a pair of swingingly supported levers pivotally connected at their inner ends centrally of the window sash and pivotally supported at their outer ends to provide a 90° movement thereof, means including a segmental gear member for swinging said levers, and means for shifting said gear member whereby a 28° travel movement thereof will swing the levers 90°.

Signed at Cleveland, Ohio, this 8th day of March, 1924.

GEORGE J. LEBER.